United States Patent
Ide

(10) Patent No.: US 7,408,682 B2
(45) Date of Patent: Aug. 5, 2008

(54) IMAGE READING APPARATUS

(75) Inventor: Naoaki Ide, Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 984 days.

(21) Appl. No.: 10/391,792

(22) Filed: Mar. 20, 2003

(65) Prior Publication Data

US 2004/0184112 A1  Sep. 23, 2004

(51) Int. Cl.
  H04N 1/40  (2006.01)
  H04N 1/38  (2006.01)
(52) U.S. Cl. .................... 358/461; 358/463; 358/474
(58) Field of Classification Search ............... 358/474, 358/448, 468, 461, 463, 482, 483
See application file for complete search history.

(56) References Cited

U.S. PATENT DOCUMENTS 5,103,321 A * 4/1992 Amachi et al. ............. 358/475
6,433,817 B1 * 8/2002 Guerra ...................... 348/157
6,958,834 B1   10/2005 Ide
2003/0090742 A1 * 5/2003 Fukuda et al. ............. 358/448
2005/0189470 A1 * 9/2005 Purcell et al. ............. 250/208.1
2005/0238259 A1 * 10/2005 Kim et al. .................. 382/312
2005/0246143 A1 * 11/2005 Han et al. .................. 702/189
2006/0203120 A1 * 9/2006 Jun ............................ 348/364

FOREIGN PATENT DOCUMENTS

JP  2-234572 A  9/1990
JP  6-194890 A  7/1994
JP  10-257317 A  9/1998

* cited by examiner

Primary Examiner—Kimberly A Williams
(74) Attorney, Agent, or Firm—Foley & Lardner LLP

(57) ABSTRACT

In an image reading apparatus according to the invention, the switching frequency of a switching power supply is set to a value equal to integral multiples of a reading frequency corresponding to each line, thereby correcting, for example, uneven image density due to ripples in a power supply voltage. Further, the switching of the switching power supply is synchronized with a horizontal synchronizing signal output from a scanner, thereby causing the positions of the ripples to correspond between lines for correcting, for example, uneven image density.

10 Claims, 6 Drawing Sheets

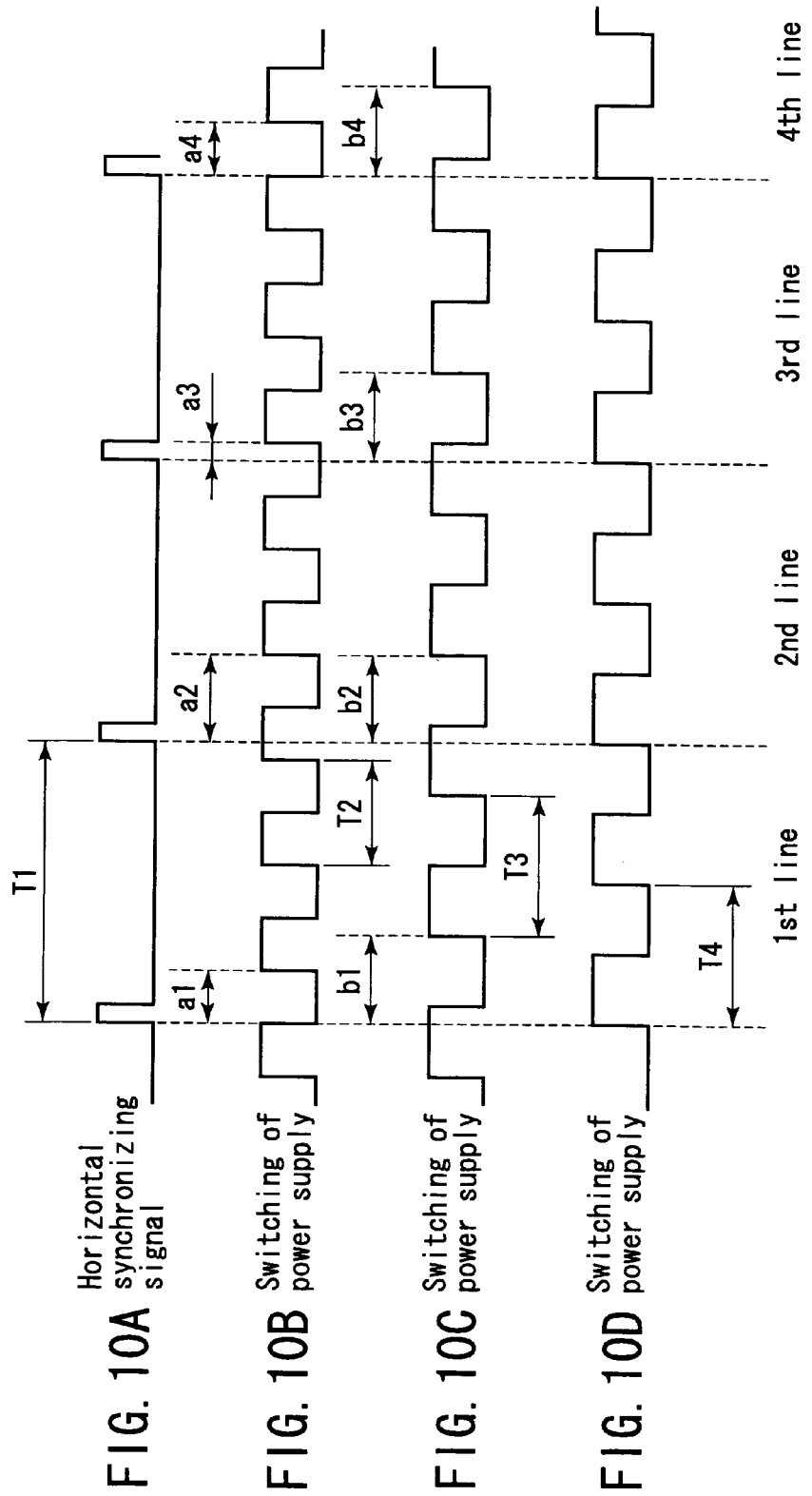

IMAGE READING APPARATUS

BACKGROUND OF THE INVENTION

The present invention relates to an image reading apparatus for reading an image of a document placed on a document table, and performing shading correction on the read image on the basis of a reference signal obtained from a white reference plate.

In general, digital copying machines, for example, comprise a scanner section for reading an image, and a print section for printing the image read by the scanner section.

The scanner section uses a CCD line sensor for reading an image. The level of voltage accumulated in the CCD line sensor are significantly influenced by variations in the illuminance of an exposure lamp, a reduction in the illuminance with time, and/or level variations in the pixels of the CCD line sensor. In light of this, the white and black levels are set immediately before image reading, so that the same image can be copied regardless of conditions (shading correction).

To this end, a white shading correction plate (hereinafter referred to as a "white reference plate") is used, and a signal from the white reference plate is read by a scanner section with several lines of elements, thereby correcting variations in the illuminance of an image, using the average level of the read signal as a white reference level.

When ripples occur in the power supply line of the scanner section, they also occur in image signal lines, thereby causing oblique lines or uneven density to be generated in a resultant image. In the prior art, to suppress the ripples, an electrolytic capacitor is added to the power supply line to increase the capacity of the power supply line.

However, this inevitably increases the capacitance of the capacitor, and involves disadvantages, such as an increase in substrate size and/or cost, or the disadvantage that a package component cannot be used.

Degraded images having density or color differences result from the ripples that occur in image signal lines. Since the occurrence of ripples in the voltage of the power supply is asynchronous with the generation of image data, the ripples do not occur at corresponding positions between the lines.

BRIEF SUMMARY OF THE INVENTION

It is an object of the invention to provide an image reading apparatus that is not influenced by ripples in a power supply voltage, and hence can perform accurate shading correction and obtain an excellent image.

To attain the object, there is provided an image reading apparatus which reads an image of a document placed on a document table, using light irradiation means moved along the document table, comprising:

generation means for generating shading correction data used in units of lines, on the basis of reflection light obtained by scanning, with the light irradiation means, a white reference plate provided near the document table outside a document reading area;

correction means for correcting, using the shading correction data generated by the generation means, a to-be-read image corresponding to each of the lines and obtained by scanning the document table with the light irradiation means; and supply means for applying a power supply voltage of a frequency to the generation means and the correction means, the frequency being equal to integral multiples of a reading frequency corresponding to each line.

There is also provided an image reading apparatus which reads an image of a document placed on a document table, using light irradiation means moved along the document table, comprising:

generation means for generating shading correction data used in units of lines, on the basis of reflection light obtained by scanning, with the light irradiation means, a white reference plate provided near the document table outside a document reading area;

correction means for correcting, using the shading correction data generated by the generation means, a to-be-read image corresponding to each of the lines and obtained by scanning the document table with the light irradiation means; and supply means for applying, to the generation means and the correction means, a power supply voltage of a certain frequency, the power supply voltage having the same phase as that of a synchronous signal output in units of scanning lines of the light irradiation means.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 10A-10D are timing charts useful in explaining the switching timing of a power supply.

DETAILED DESCRIPTION OF THE INVENTION

An image reading apparatus according to an embodiment of the invention will be described with reference to the accompanying drawings.

Figure 1:
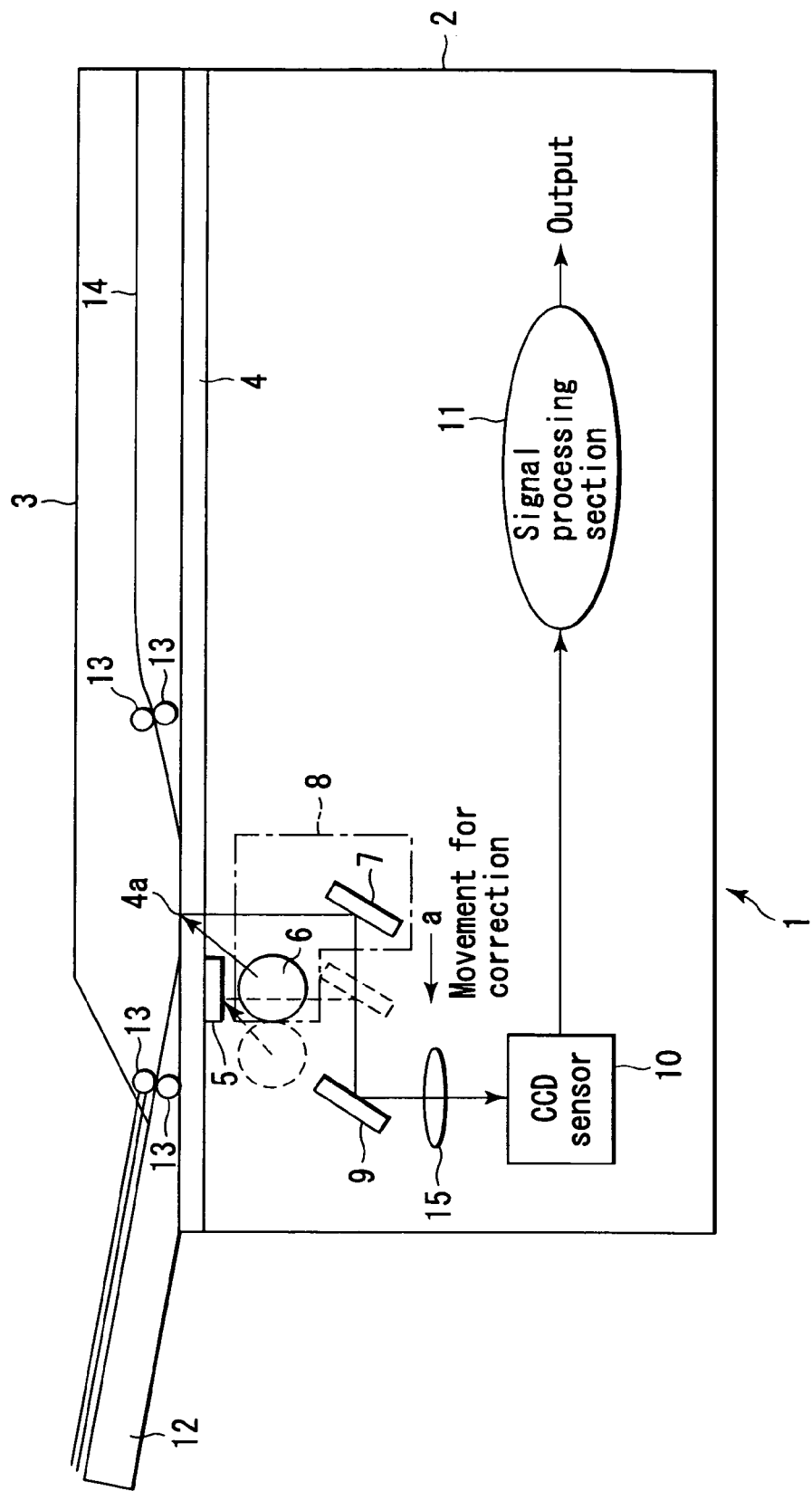
FIG. 1 is a view illustrating the internal structure of an image reading apparatus according to an embodiment of the invention.

FIG. 1 is a view schematically illustrating the structure of a scanner section 1 as an image reading apparatus of the invention.

The scanner section 1 comprises a main unit 2 containing a reading optical system, and a sheet-feeder-type auto feeder unit 3.

The upper surface of the main unit 2 is provided with transparent glass 4, and a white reference plate (shading correction plate) 5 used to read a reference value for shading correction is provided on the left portion of the lower surface of the glass 4. The portion of the upper surface of the glass 4 located above and to the right of the white reference plate 5 serves as a document irradiation position 4a for document reading.

In the main unit 2, a carriage 8 with an exposure lamp 6 and mirror 7 is movably provided (in the conveyance direction of a document). In accordance with the movement of the carriage 8, the irradiation position of the exposure lamp 6 moves between the document irradiation position 4a and the reading position of the white reference plate 5. Before reading a document, the carriage is positioned in (moved to) the reading position of the white reference plate 5, and positioned in (moved to) the document irradiation position 4a after irradiation for reading the white reference plate 5. During reading a document, the irradiation position of the exposure lamp 6 is fixed to the document irradiation position 4a.

In FIG. 1, the position of the exposure lamp 6 when reading a document is indicated by the solid line, and that of the exposure lamp 6 when reading the white reference plate 5 is indicated by the broken line.

When the irradiation position of the exposure lamp 6 corresponds to the document irradiation position 4a, the exposure lamp 6 emits, to the document irradiation position 4a, light having a certain width, as a document reading width, in the main-scanning direction (in the longitudinal direction of the exposure lamp 6), thereby exposing a document.

The main unit 2 further contains a mirror 9 and CCD line sensor 10. The mirror 9 is fixed to the main unit 2. This enables light emitted from the exposure lamp 6 and reflected from the white reference plate 5 or document irradiation position 4a to be guided to the CCD line sensor 10 via the mirrors 7 and 9 and an image-forming lens 15.

The CCD line sensor 10 subjects entered reflection light to photoelectric conversion, and outputs an electrical signal indicative of the reflection light. The CCD line sensor 10 comprises CCD elements of one line corresponding to pixels arranged in the main-scanning direction of a document. The outputs of the CCD elements corresponding to the voltages accumulated therein are latched by a latch circuit, and are sequentially generated in synchronism with a clock corresponding to one line and supplied from a CPU 20. An electric signal output from the CCD line sensor 10 is supplied to a signal processing section 11.

The signal processing section 11 performs processing, such as amplification, A/D conversion, shading correction, etc. Image data and/or a determination result as to dust or dirt, subjected to the processing, is output to an external device, such as a PC (personal computer), printer, etc.

The auto feeder unit 3 comprises a document table 12 on which a plurality of documents can be placed, a conveyance system 13 including a conveyance roller for picking up the documents one by one from the document table 12 and conveying them (in the sub-scanning direction) through the document irradiation position 4a, and a tray 14 to which the documents conveyed by the conveyance system 13 and passed through the document irradiation position 4a are discharged.

The signal processing section 11 comprises an amplifier 27 for amplifying an analog signal supplied from the CCD line sensor 10, and an A/D converter circuit 28 for converting the analog signal amplified by the amplifier 27 into a digital signal. The output of the A/D converter circuit 28 is supplied to a RAM 22.

Figure 2:
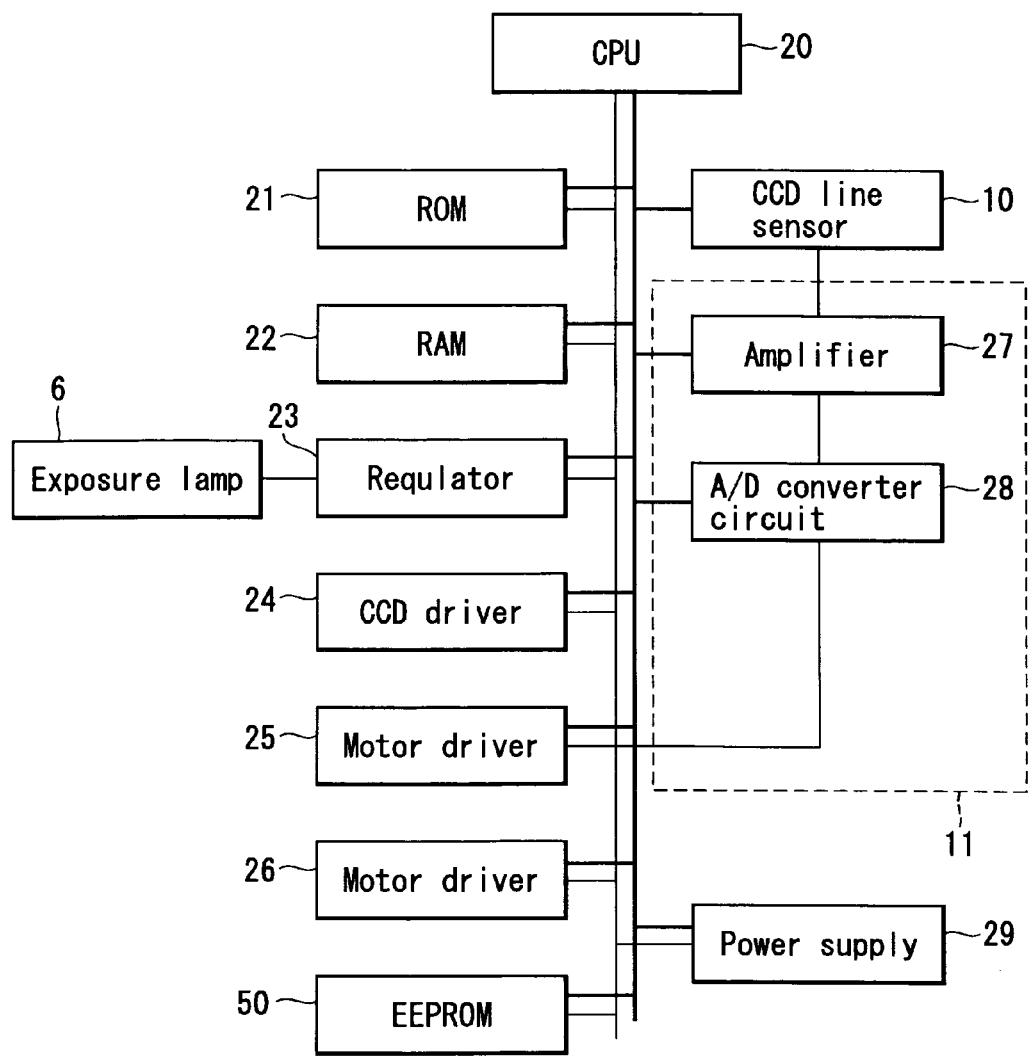
FIG. 2 is a block diagram schematically illustrating a control system employed in the image reading apparatus.

FIG. 2 illustrates a control system employed in the above-described scanner section 1.

As shown, the scanner section 1 comprises a CPU 20 for controlling the entire system, a ROM 21 storing, for example, a control program, a RAM 22 storing various data items, an EEPROM 50 that can hold stored contents even in the power-off state, a regulator 23 for controlling the lighting of the exposure lamp 6, a CCD driver 24 for driving the CCD line sensor 10, a motor driver 25 for driving a motor (not shown) for the movement of the carriage 8, a motor driver 26 for driving a motor (not shown) used to rotate the conveyance system 13, the above-mentioned signal processing section 11 and a power supply 29 for supplying a power supply voltage to each section.

The power supply 29 supplies a power supply voltage having a predetermined switching (SW) frequency. This switching (SW) frequency is adjusted by the CPU 20 so that it will be integral multiples of the reading frequency of the CCD line sensor 10 used to read one line (main-scanning directional output range) data. Specifically, as shown in FIGS. 10A and 10C, the power supply voltage of the power supply 29 is applied to each section at a switching (SW) frequency with signal pulse intervals of T3 in synchronism with a horizontal synchronizing signal with signal pulse intervals of T1.

A value of gradation is a digital value that corresponds to the intensity of light reflected from the white reference plate 5 when the exposure lamp 6 emits light to the plate 5, and that is obtained from each element of the CCD line sensor 10 via the amplifier 27 and A/D converter circuit 28. For example, there are 256 gradation values, "0" corresponding to black, and "256" corresponding to white.

Upon the turn on of the power supply or upon the start of document reading, the CPU 20 performs shading correction on a digital value using a shading correction value that is stored in the RAM 22 and corresponds to each element of the CCD line sensor 10, thereby outputting the resultant value as a reading result. The digital value corresponds to the intensity of light reflected from the white reference plate 5 when the exposure lamp 6 emits light to the plate 5, and is obtained from each element of the CCD line sensor 10 via the amplifier 27 and A/D converter circuit 28. As a result, a high quality image can always be obtained, whereby the reliability of the apparatus is increased. The reading result may be displayed on a display section (not shown) or output to an external device such as a PC (personal computer), printer, etc.

The CPU 20 generates, before reading a document, a shading correction value for correcting degradation of an electrical signal supplied from the CCD line sensor 10 that is caused by a change with time in the exposure lamp 6 or a difference in brightness between the central and end portions of the lamp, and registers the generated shading correction value in the RAM 22.

During document reading, the CPU 20 performs shading correction on a digital value using a shading correction value that is stored in the RAM 22 and corresponds to each element of the CCD line sensor 10, thereby outputting the resultant value as a reading result. The digital value corresponds to the intensity of reflection light, and is obtained from each element of the CCD line sensor 10 via the amplifier 27 and A/D converter circuit 28.

Figure 3:
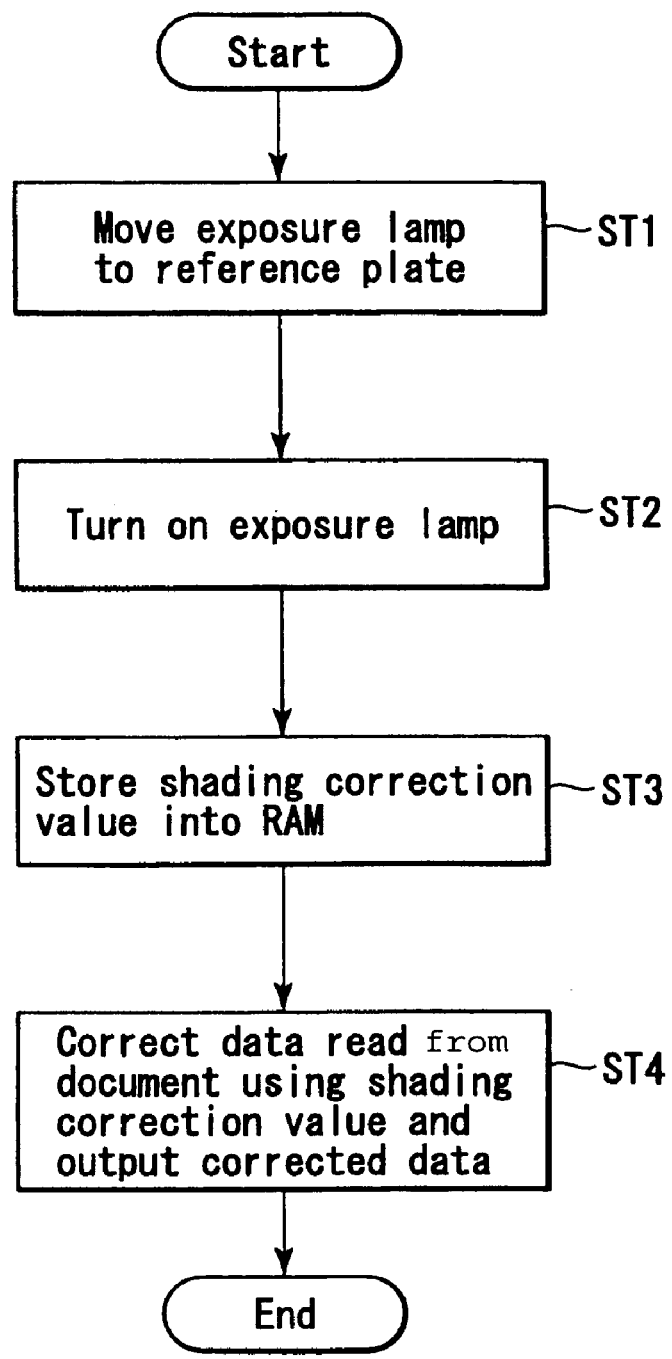
FIG. 3 is a flowchart useful in explaining shading correction processing.

Referring now to the flowchart of FIG. 3, shading correction processing will be described.

Upon turn on of the power supply, the CPU 20 moves the carriage 8 and hence the exposure lamp 6 to the reading position of the white reference plate 5 (ST1), and lights the exposure lamp 6 (ST2).

As a result, light reflected from the white reference plate 5 is guided to the CCD line sensor 10, and an electrical signal from each element of the CCD line sensor 10 is output via the amplifier 27 from the A/D converter circuit 28. A shading correction value that corresponds to each of the elements arranged in line and incorporated in the CCD line sensor 10 is calculated on the basis of the output data of the A/D converter circuit 28, and is stored into the RAM 22 (ST3). Thus, a shading correction value corresponding to, for example, each pixel (element) of the CCD line sensor 10 is stored.

After that, the CPU 20 performs, when reading a document, shading correction on a digital value indicative of the intensity of reflection light and supplied from each element of the CCD line sensor 10 via the amplifier 27 and A/D converter circuit 28, using a shading correction value that is stored in the RAM 22 and corresponds to each element of the CCD line sensor 10, thereby outputting the resultant value as a reading result (ST4).

Figure 4:
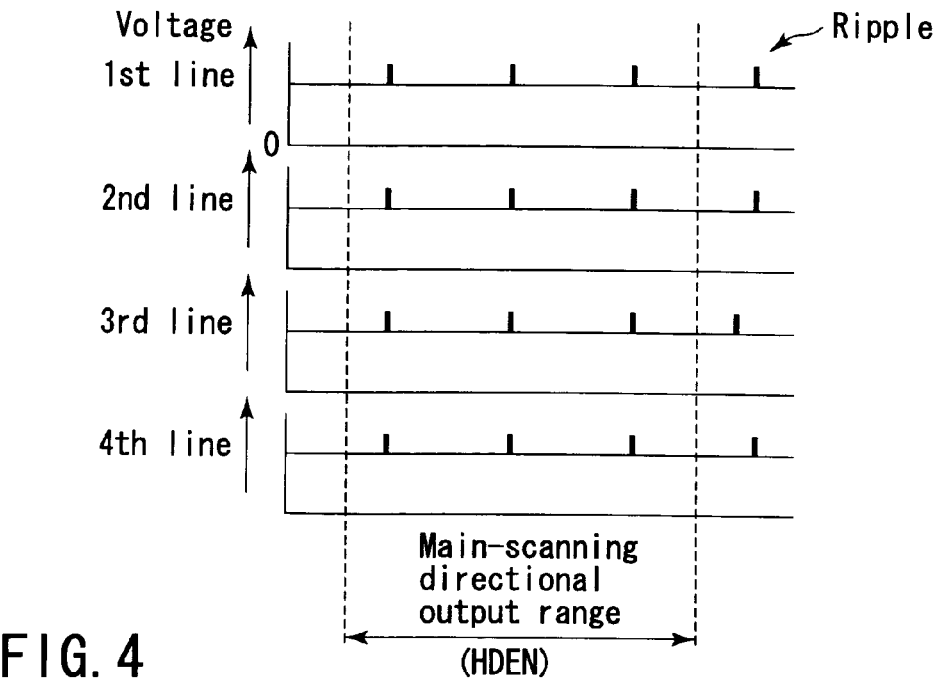
FIGS. 4 and 7 are views illustrating the power supply waveform of each line.
Figure 5:
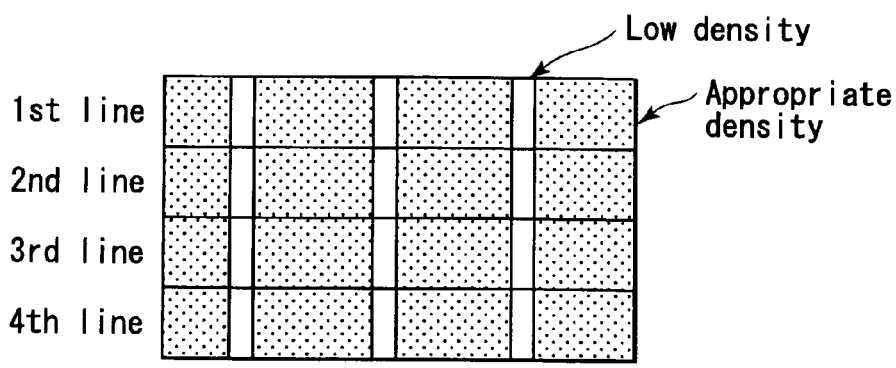
FIGS. 5 and 8 are views illustrating image data obtained before shading correction.
Figure 6:
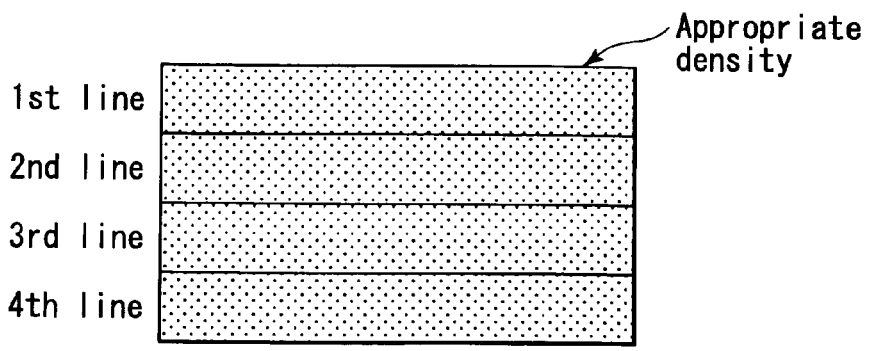
FIGS. 6 and 9 are views illustrating image data output after shading correction.

At this time, as shown in FIG. 4, the switching frequency of the power supply 29 is set to a value equal to integral multiples of a reading frequency for each line, thereby realizing a phase-accordance switching frequency between the lines. When a ripple in level occurs at the same signal-pulse-phase of image signals corresponding to the lines, the main-directional position of the ripple is identical between the lines. Accordingly, when shading correction is performed, a change in density (each white portion in each line shown in FIG. 5) due to a ripple is corrected. As a result, an output image can be made to have no change in density as shown in FIG. 6.

In this example, shading correction is performed on the basis of data obtained from the second line. Accordingly, the same change in density as in the second line can be adjusted by shading correction. In the example, since the other lines show the same change in density as the second line, the output image is prevented from having variations in density.

Thus, a high quality image free from uneven density can be provided.

As described above, uneven image density, for example, due to a ripple in power supply voltage can be corrected by setting the switching frequency of the power supply 29 to a value equal to integral multiples of a reading frequency for each line.

Figure 7:
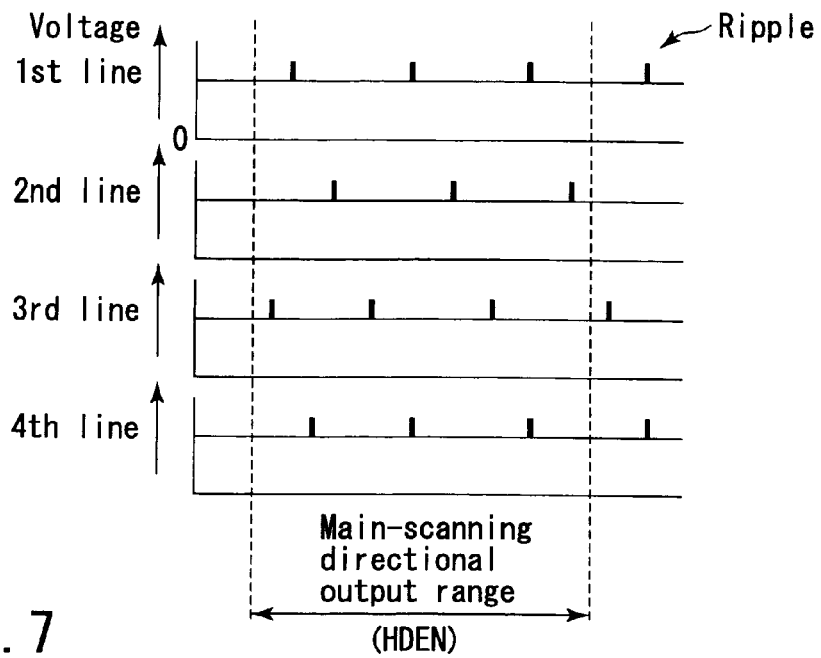
Figure 8:
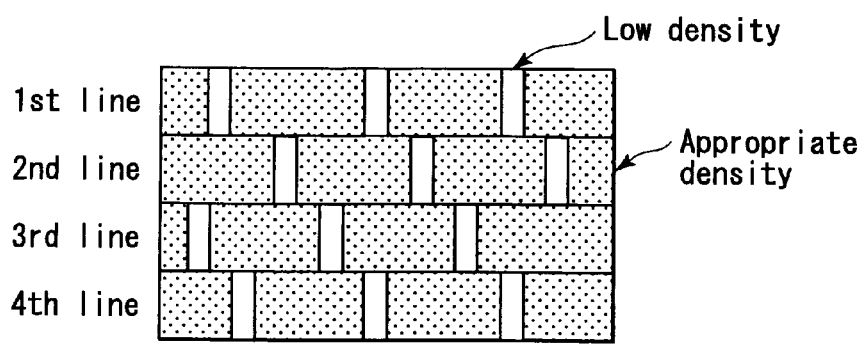
Figure 9:
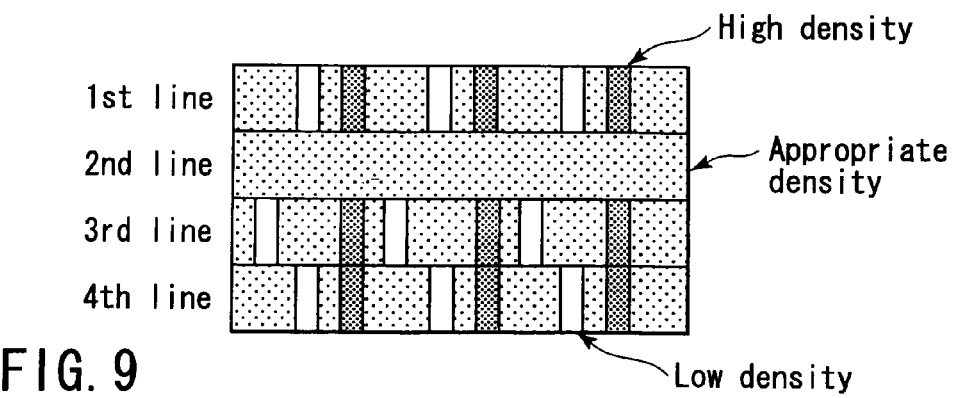

On the other hand, if no countermeasure is taken against ripples as in the prior art, ripples may occur at different frequencies in different lines as shown in FIG. 7. In this case, changes in density due to the ripples do not occur at corresponding main-scanning-directional positions in the lines as shown in FIG. 8. Accordingly, the ripples overlap with image signals, thereby causing an output image to have uneven density in the form of stripes, as shown in FIG. 9.

In this example, shading correction is performed on the basis of data obtained from the second line. Accordingly, image density in the second line can be adjusted by shading correction.

However, concerning the other lines (first, third and fourth lines), shading correction is performed on even an appropriate density portion, thereby forming an image having portions of high density and portions of low density due to ripples.

Referring to FIGS. 10A, 10B and 10C, a description will be given of the difference in the switching timing of the power supply in the present invention and prior art.

In a conventional power supply, concerning a horizontal synchronizing signal (each pulse of which is generated for each line) that determines the reading timing of the reading unit, the time required from the rise of a horizontal synchronizing signal pulse to the rise of the first switching signal pulse of the power supply is not constant between lines. In the case of FIG. 10B, since $a1 \ne a2 \ne a3$, and $a1=a4$, the image as shown in FIG. 9 is output.

Accordingly, the relationship between the cycle $T1$ of the horizontal synchronizing signal and the cycle $T2$ of switching of the power supply satisfies $T1 \ne n*T2$ (n is an integer). In the power supply 29 of the invention, since the switching frequency is set to a value equal to integral multiples of the frequency of the horizontal synchronizing signal, the time required from the rise of a horizontal synchronizing signal pulse to the rise of the first switching signal pulse of the power supply 29 is constant between lines, although the phase of the first switching signal pulse with respect to the rise of each horizontal synchronizing signal pulse is not always constant each time the power supply 29 is turned on or off. In other words, although the phase of the first switching signal pulse varies in accordance with the generation time of the switching signal, switching is performed at the same timing between lines. In the case of FIG. 10C, since $b1=b2=b3=b4$, the image as shown in FIG. 6 is output.

Accordingly, the relationship between the cycle $T1$ of the horizontal synchronizing signal and the cycle $T3$ of switching of the power supply 29 satisfies $T1=n*T3$ (n is an integer). In terms of frequency, the relationship between the switching frequency $F3$ ($=1/T3$) of the power supply 29 and the reading frequency $F1$ ($=1/T1$) for each line satisfies $F3=n*F1$ (n is an integer).

In the above embodiment, the CCD line sensor 10 may have a single line of CCD elements or a plurality of lines of CCD elements.

In the case where the sensor has a plurality of lines of elements, the lines of elements may read image signals corresponding to different colors (color scanner compatible type). In the case of a color scanner, if ripples do not occur at corresponding positions between lines, they cause not only density differences but also color differences.

In the present invention, however, ripples occur at predetermined positions in the main-scanning direction, therefore density and color differences can be prevented.

Second Embodiment

In the above-described first embodiment, the switching frequency of the power supply 29 is set to a value equal to integral multiples of a reading frequency for each line, thereby correcting, for example, uneven image density due to ripples that occur in the voltage of the power supply 29. However, the present invention is not limited to this structure. The second embodiment may be constructed such that pulses of the switching signal for the power supply 29 are synchronized with the pulses of the horizontal synchronizing signal for the scanner, thereby making the phases of ripples occurring in the voltage of the power supply identical between lines to correct, for example, uneven image density.

In the power supply 29 of this embodiment, as shown in FIGS. 10A and 10D, the start of switching of the power supply 29 is synchronized with each pulse of the horizontal synchronizing signal, thereby realizing switching that is always synchronous with the horizontal synchronizing signal. Since synchronous switching can be performed between lines, the switching frequency of the power supply 29 is not limited, which facilitates setting of frequency. Since there is no phase difference in switching, the image as shown in FIG. 6 can be output.

Accordingly, no problem will occur if the relationship between the cycle $T1$ of the horizontal synchronizing signal and the cycle $T3$ of switching of the power supply 29 satisfies either $T1=n*T4$ or $T1 \ne n*T4$ (n is an integer).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus which reads an image of a document placed on a document table, using light irradiation means moved along the document table, comprising:

generation means for generating shading correction data used in units of lines, on the basis of reflection light obtained by scanning, with the light irradiation means, a white reference plate provided near the document table outside a document reading area;

correction means for correcting, using the shading correction data generated by the generation means, a to-be-read image corresponding to each of the lines and obtained by scanning the document table with the light irradiation means; and supply means for applying a power supply voltage of a frequency to the generation means and the correction means, the frequency being equal to integral multiples of a reading frequency corresponding to each line, wherein uneven image density caused by a ripple in the supply means is controlled to occur at a specific part of pixels for each line, and is corrected by the correction means.

2. The image reading apparatus according to claim 1, wherein, based on the power supply voltage being at a frequency equal to integral multiples of the reading frequency corresponding to each line, a first pulse corresponding to powering on of the power supply voltage at a first point in time is at a same phase relationship with a first pulse of the reading frequency, as a second pulse corresponding to powering on of the power supply voltage at a second point in time and a second pulse of the reading frequency.

3. The image reading apparatus according to claim 1, wherein the supply means applies the power supply voltage of the frequency being equal to integral multiples of the reading frequency corresponding to each line, so as to control the ripple in the supply means to occur at the specific part of pixels for each line of a plurality of lines of pixels.

4. An image reading apparatus which reads an image of a document placed on a document table, using light irradiation means moved along the document table, comprising:

generation means for generating shading correction data used in units of lines, on the basis of reflection light obtained by scanning, with the light irradiation means, a white reference plate provided near the document table outside a document reading area;

correction means for correcting, using the shading correction data generated by the generation means, a to-be-read image corresponding to each of the lines and obtained by scanning the document table with the light irradiation means; and supply means for applying, to the generation means and the correction means, a power supply voltage of a certain frequency, the power supply voltage having the same phase as that of a synchronous signal output in units of scanning lines of the light irradiation means, wherein uneven image density caused by a ripple in the supply means is controlled to occur at a specific part of pixels for each line, and is corrected by the correction means.

5. The image reading apparatus according to claim 4, wherein the synchronous signal corresponds to a horizontal synchronizing signal used to read pixels in units of scanning lines.

6. The image reading apparatus according to claim 4, wherein the supply means applies the power supply voltage of the frequency being equal to integral multiples of the reading frequency corresponding to each line, so as to control the ripple in the supply means to occur at the specific part of pixels for each line of a plurality of lines of pixels.

7. An image reading apparatus which reads an image of a document, comprising:

a scanning section configured to scan the document in units of lines while moving in a sub-scanning direction with respect to the document;

a line sensor configured to convert, into an electrical signal, reflection light corresponding to pixels of the line sensor, the pixels corresponding to each line of the scanning section;

an output section configured to output, at a predetermined frequency, an electrical signal obtained from the line sensor and corresponding to the pixels which correspond to each line, by scanning a white reference plate with the scanning section, the white reference plate being used to correct the electrical signal output from the line sensor and corresponding to the pixels when scanning the document;

a storage section configured to store, as shading correction data, the electrical signal output from the output section and corresponding to the pixels which correspond to each line;

a correction section configured to correct, using the shading correction data stored in the storage section, the electrical signal obtained from the line sensor when the scanning section scans the document, the electrical signal corresponding to the pixels which correspond to each line; and a supply section configured to apply, to each of the above-mentioned sections, a power supply voltage of a frequency equal to integral multiples of a reading frequency corresponding to each line, wherein uneven image density caused by a ripple in the supply section is controlled to occur at a specific part of pixels for each line, and is corrected by the correction section.

8. The image reading apparatus according to claim 7, wherein the supply section applies the power supply voltage of the frequency being equal to integral multiples of the reading frequency corresponding to each line, so as to control the ripple in the supply section to occur at the specific part of pixels for each line of a plurality of lines of pixels.

9. An image reading apparatus which reads an image of a document, comprising:

a scanning section configured to scan the document in units of lines while moving in a sub-scanning direction with respect to the document;

a line sensor configured to convert, into an electrical signal, reflection light corresponding to pixels of the line sensor, the pixels corresponding to each line of the scanning section;

an output section configured to output, at a predetermined frequency, an electrical signal obtained from the line sensor and corresponding to the pixels which correspond to each line, by scanning a white reference plate with the scanning section, the white reference plate being used to correct the electrical signal output from the line sensor and corresponding to the pixels when scanning the document;

a storage section configured to store, as shading correction data, the electrical signal output from the output section and corresponding to the pixels which correspond to each line;

a correction section configured to correct, using the shading correction data stored in the storage section, the electrical signal obtained from the line sensor when the scanning section scans the document, the electrical signal corresponding to the pixels which correspond to each line; and a supply section configured to apply, to each of the above-mentioned sections, a power supply voltage of a frequency equal to integral multiples of a reading frequency corresponding to each line, wherein uneven image density caused by a ripple in the supply section is controlled to occur at a specific part of pixels for each line, and is corrected by the correction section.

10. The image reading apparatus according to claim 9, wherein the supply section applies the power supply voltage of the frequency being equal to integral multiples of the reading frequency corresponding to each line, so as to control the ripple in the supply section to occur at the specific part of pixels for each line of a plurality of lines of pixels.

* * * * *